United States Patent
Wan et al.

(10) Patent No.: US 7,040,900 B2
(45) Date of Patent: May 9, 2006

(54) MAIN BOARD

(75) Inventors: Tai-Shing Wan, Pingyuan Village (TW); Wen-Ji Tsai, Sinjhuang (TW)

(73) Assignee: Quanta Computer Inc., Tao Yuan Shien (TW)

( * ) Notice: Subject to any disclaimer, the term of this patent is extended or adjusted under 35 U.S.C. 154(b) by 0 days.

(21) Appl. No.: 11/063,270

(22) Filed: Feb. 22, 2005

(65) Prior Publication Data
US 2005/0233616 A1   Oct. 20, 2005

(30) Foreign Application Priority Data
Apr. 14, 2004   (TW) ............................... 93110331 A

(51) Int. Cl.
*H01R 12/00*   (2006.01)
(52) U.S. Cl. ................. 439/55; 439/951; 361/777; 361/783; 361/760; 174/260; 174/261
(58) Field of Classification Search ............... 439/55, 439/951; 361/777, 783, 760; 174/260, 261
See application file for complete search history.

(56) References Cited

U.S. PATENT DOCUMENTS 5,751,557 A * 5/1998 Silva ........................... 361/777
5,788,511 A * 8/1998 Burnworth et al. ........... 439/63

* cited by examiner

*Primary Examiner*—Gary F. Paumen
(74) *Attorney, Agent, or Firm*—Thomas, Kayden, Horstemeyer & Risley

(57) ABSTRACT

A main board with a base comprising a first port and a second port parallel to each other and with a gap formed therebetween. First and second connectors are selectively disposed on the base. When the first connector is disposed on the base, a first distance is formed between first pins and a standard surface. When the second connector is disposed on the base, a second distance is formed between second pins and the standard surface. The difference between the first and second distances is equal to the gap. The first connector connects PATA hard disk drive, and the second connector connects SATA hard disk drive.

18 Claims, 4 Drawing Sheets

MAIN BOARD

BACKGROUND

The invention relates to a main board and in particular to a main board for a computer capable of accepting different types of hard disk drives during manufacturing.

A conventional main board typically only provides a connection port for a Parallel AT Attachment (PATA) hard disk drive. Recently, however, Serial AT Attachment (SATA) hard disk drives have been introduced, creating demand for development of a new main board which is compatible with the SATA hard disk drive. SATA hard disk drives operate faster than PATA hard disk drives and have fewer pins. Thus, the connector on the main board for the SATA hard disk drive is different than that for PATA hard disk drives.

SATA hard disk drives, however, are relating new, and as such the price is relatively higher than that for conventional hard disk drives. Therefore, mass production of main boards accepting only SATA hard disk drive is risky.

SUMMARY

The main board of an embodiment of the present invention comprises a base, a first connector and a second connector. The base comprises a first port and a second port. The first and the second ports are parallel to each other, and a gap is formed therebetween. The first connector comprises a first surface and a plurality of first pins disposed thereon. The second connector comprises a second surface and a plurality of second pins disposed thereon. The first and second connectors are selectively disposed on the base. When the first connector is disposed on the base, the first pins are connected to the first port, and the first surface is aligned with a standard surface. A first distance is formed between the first pins and the standard surface. When the second connector is disposed on the base, the second pins are connected to the second port, and the second surface is aligned with the standard surface. A second distance is formed between the second pins and the standard surface. The difference between the first and second distances is substantially equal to the interval.

The main board of an embodiment of the invention can vary with demand. A connector for a PATA or SATA hard disk drive can be selectively disposed thereon for connection of a PATA or SATA hard disk drive. Due to the gap being substantially equal to the difference between the first distance and the second distance, the PATA or SATA hard disk drive can connect to the connector and align with the standard surface. Namely, the PATA or SATA hard disk drive disposed on the main board is positioned in the same place, thus, reducing the space in an electronic device (computer, note book and et cetera) required by the main board.

The main board of an embodiment of the invention is selectively provided with a connector for PATA or SATA hard disk drive. Therefore, on main board can accept either PATA or SATA hard disk drive, thus reducing manufacturing cost.

BRIEF DESCRIPTION OF THE DRAWINGS

Embodiments of the invention can be more fully understood by reading the subsequent detailed description and examples with references made to the accompanying drawings, wherein.

DETAILED DESCRIPTION

Figure 1:
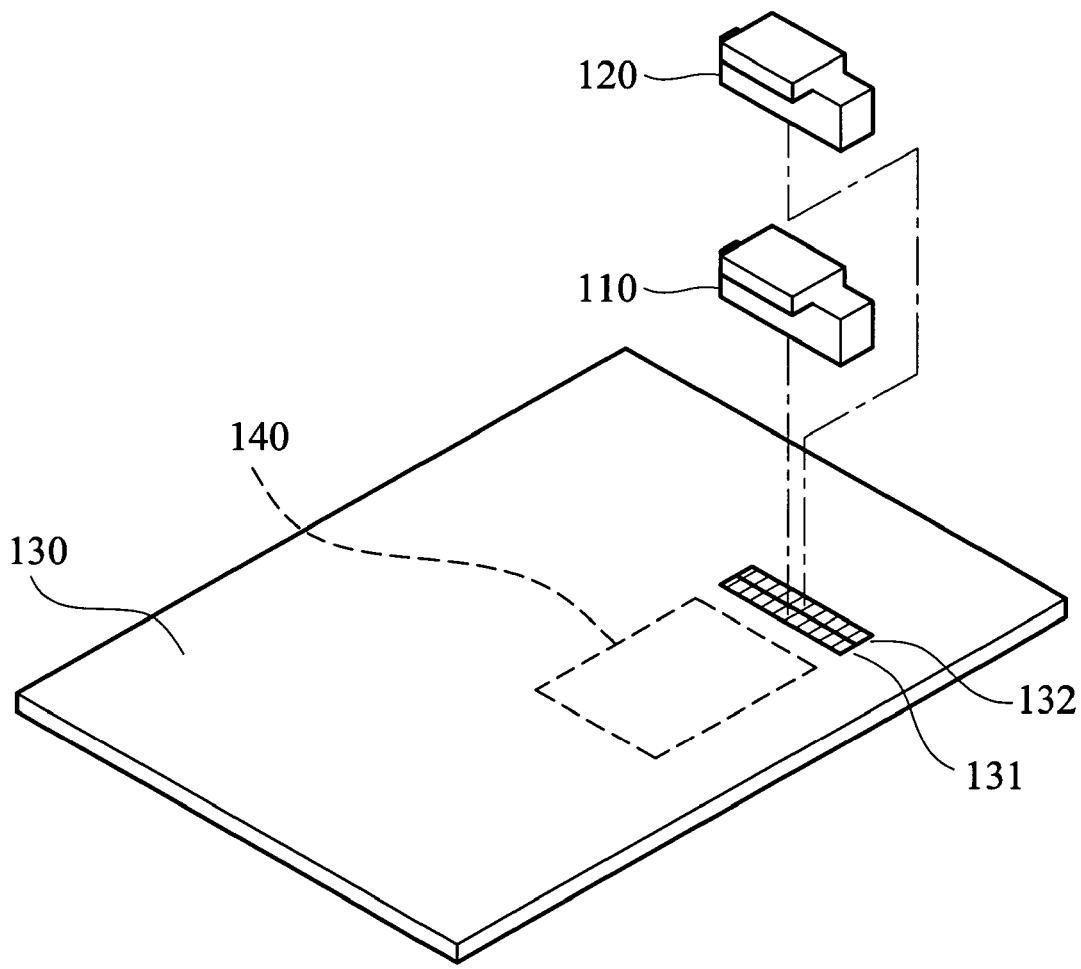
FIG. 1 shows an exploded view of a main board of an embodiment of the present invention.

FIG. 1 shows a main board 100 of an embodiment of the invention comprising a first connector 110, a second connector 120 and a base 130. The base 130 comprises a first port 131 and a second port 132 which are parallel to each other. The first connector 110 and the second connector 120 are selectively installed on the first port 131 or the second port 132, respectively, for mounting on the base 130. A hard disk drive arranged at position 140 is located in front of the first port 131 and the second port 132.

Figure 2:
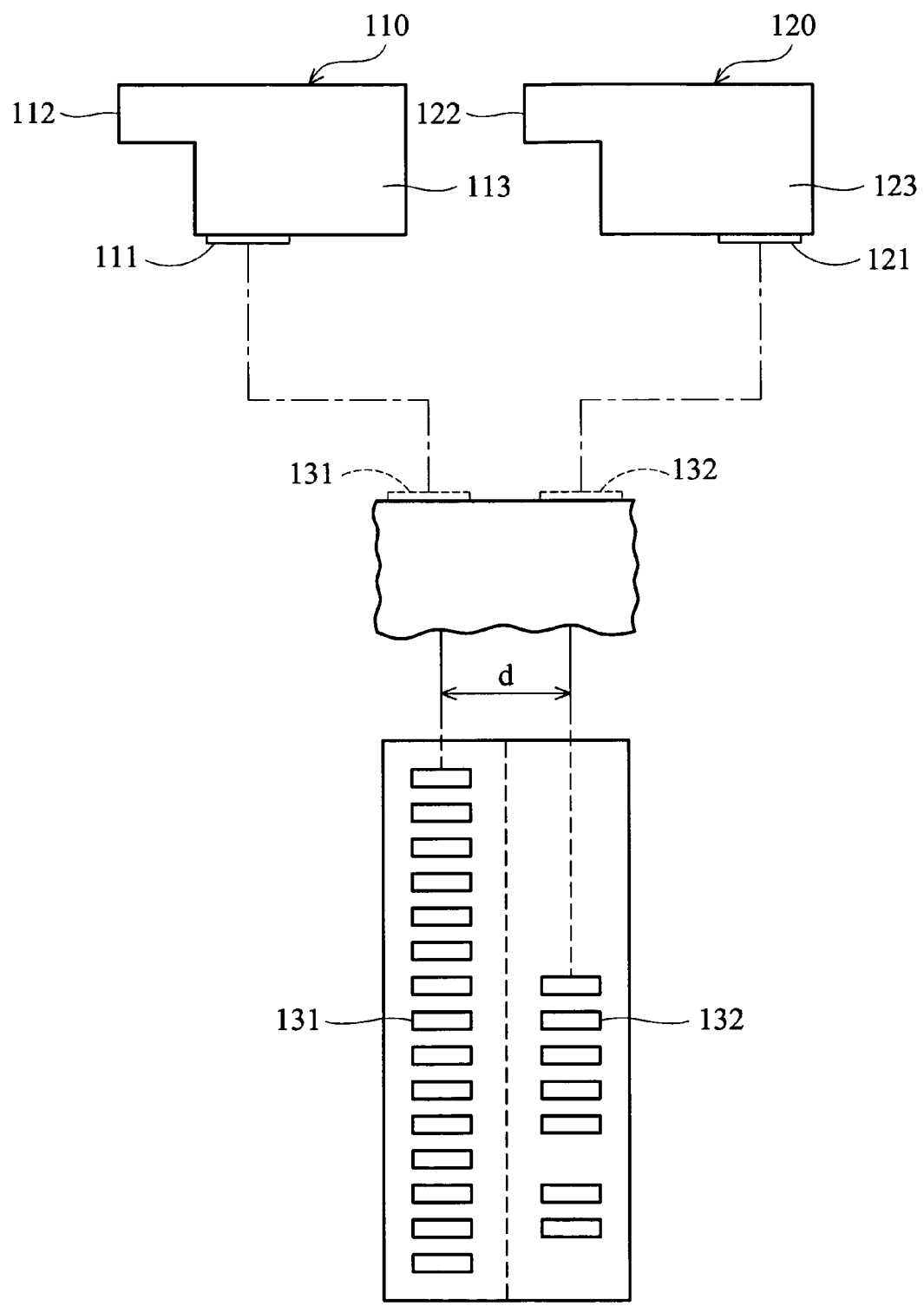
FIG. 2 shows a schematic view a first connector and a second connector of the main board.

FIG. 2 shows the first connector 110 and the second connector 120. The first connector 110 comprises a plurality of first pins 111, a first surface 112 and a first body 113. The first pins 111 are disposed at the front end of the bottom of the first body 113. The second connector 120 comprises a plurality of second pins 121, a second surface 122 and a second body 123. The second pins 121 are disposed at the rear end of the bottom of the second body 123. A gap d is formed between the first port 131 and the second port 132.

Figure 3A:
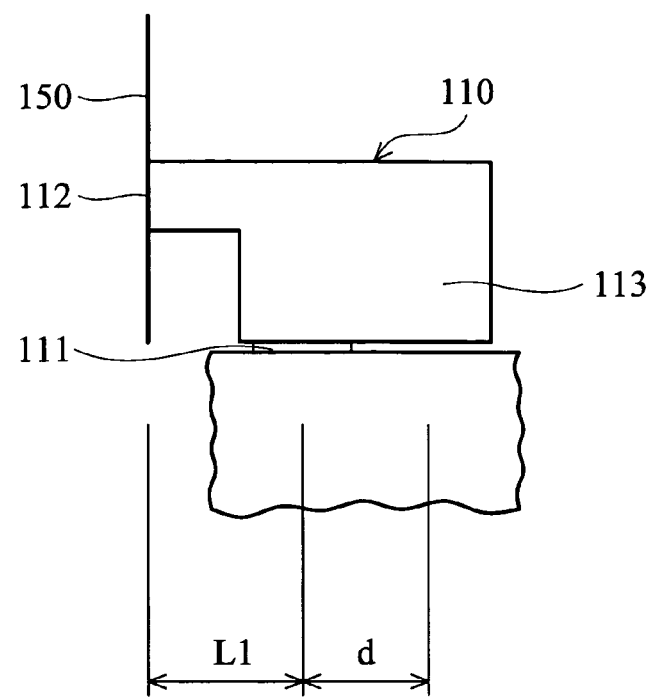
FIG. 3a shows a schematic view of the first connector disposed on the main board.

FIG. 3a is a cross section of the first connector 110 disposed on the base 130. The first pins 111 are connected to the first port 131, and the first surface 112 is aligned with a standard surface 150. A first distance L1 is formed between the first pins 111 and the standard surface 150.

Figure 3B:
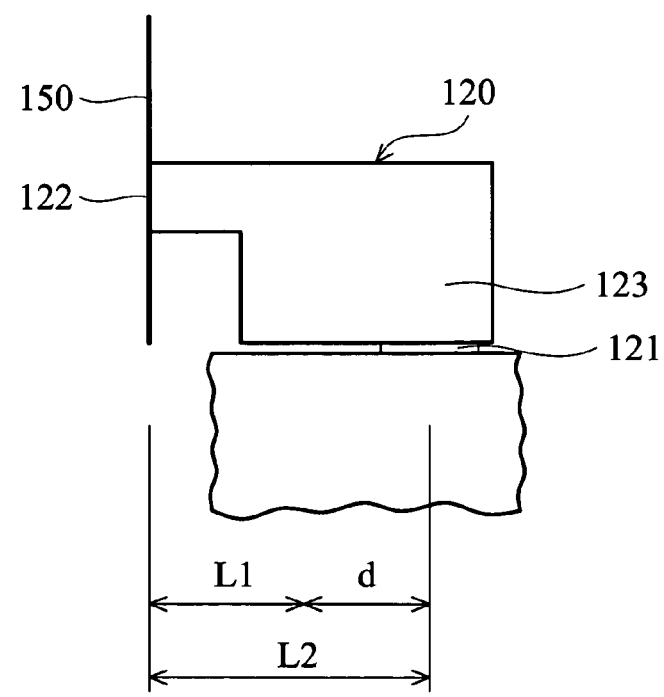
FIG. 3b shows a schematic view of the second connector disposed on the main board.

FIG. 3b is a cross section of the second connector 120 disposed on the base 130. The second pins 121 are connected to the second port 132, and the second surface 122 is aligned with the standard surface 150. A second distance L2 is formed between the second pins 121 and the standard surface 150. The difference between the first distance L1 and the second distance L2 is substantially equal to the gap d.

If the first connect 110 is selected during manufacturing, for example, the mentioned first pins 111 are welded on the first port 131. If the second connector 120 is selected during manufacturing, the second pins 121 are welded on the second port 132.

The mentioned first connector 110 is for connecting a PATA hard disk drive, and the second connector 120 is for connecting a SATA hard disk drive. The number of second pins 121 is greater than the number of the first pins 111.

Figure 4:
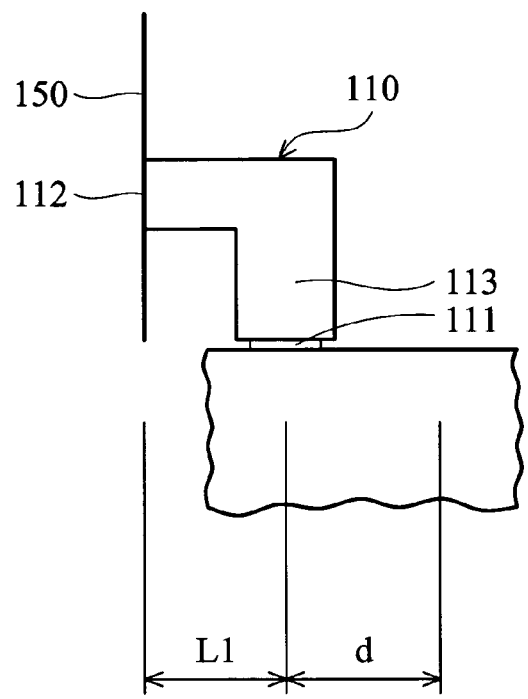
FIG. 4 shows a schematic view of a first connector with thinner first base.

FIG. 4 shows the first body 113 as an example. The width (thickness) of the first body 113 can be thinner or thicker than the second body 123 depending on demand, and then the first connector 110 can then be easily welded on the base 130.

Figure 5:
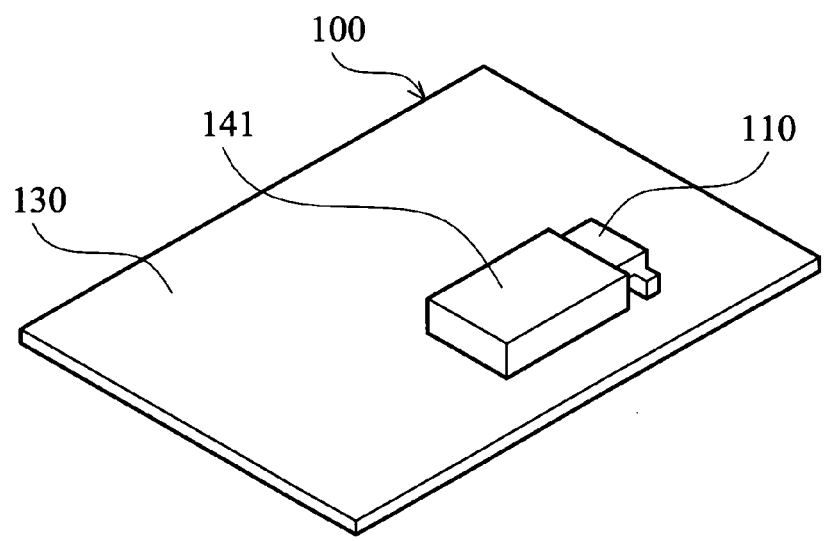
FIG. 5 shows a schematic view of a hard disk connected to the main board.

Referring to FIG. 5, the main board is applicable for use in an electronic device, such as a notebook computer. During manufacture of the main board, variable according to demand, the first connector 110 or the second connector 120 can be selectively disposed on the main board for connecting a first hard disk drive 141 or a second hard disk drive (not shown). FIG. 5 shows an example of the first connector 110 connecting the first hard disk drive 141. The connector 110 is mounted on the main board 100 to connect the first hard disk drive 141, such as a PATA hard disk drive. Namely, the electronic device such as a notebook computer uses a PATA hard disk drive. Similarly, when the second connector 120 is mounted on the main board 100 to connect the second hard disk drive (SATA hard disk drive), the electronic device uses a SATA hard disk drive. No matter whether a PATA or the SATA hard disk drive is used, the arranged position of the hard disk drive on the main board is in the same location.

The main board of an embodiment of the present invention can vary with demand. A connector for a PATA or SATA hard disk drive can be selectively disposed on the main board for connecting a PATA or SATA hard disk drive. Due to the gap being substantially equal to the difference between the first distance and the second distance, the PATA or SATA hard disk drive can connect to the connector and align with the standard surface. Namely, the PATA or SATA hard disk drive disposed on the main board is positioned in the same place, thus, reducing the space in an electronic device (computer, note book and et cetera) required by the main board.

The main board of the embodiment of the present invention is selectively provided a connector for the PATA or SATA hard disk drive. Therefore, fabricating one type of main board can suit for either PATA or SATA hard disk drive, reducing manufacture cost.

While the invention has been described by way of example and in terms of preferred embodiments, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What invention claimed is:

1. A main board, comprising:
a base comprising a first port and a second port, wherein the first port and the second port are parallel to each other, and a gap is formed therebetween;
a first connector comprising a first surface and a plurality of first pins; and
a second connector comprising a second surface and a plurality of second pins, wherein the first and second connectors are selectively disposed on the base,
when the first connector is disposed on the base, the plurality of first pins is connected to the first port, and a first distance is formed between the plurality of first pins and a standard surface;
when the second connector is disposed on the base, the plurality of second pins is connected to the second port, and a second distance is formed between the plurality of second pins and the standard surface, and
the difference between the first distance and the second distance is substantially equal to the gap.

2. The main board as claimed in claim 1, wherein when the first connector is disposed on the base, the first surface is aligned with the standard surface.

3. The main board as claimed in claim 1, wherein when the second connector is disposed on the base, the second surface is aligned with the standard surface.

4. The main board as claimed in claim 1, wherein the first connector further comprises a first body and the second connector further comprises a second body, the plurality of first pins is disposed on the bottom of the first body, the plurality of second pins is disposed on the bottom of the second body, and the width (thickness) of the second body exceeds the width (thickness) of the first body.

5. The main board as claimed in claim 1, wherein the number of the second pins is less than the number of the first pins.

6. The main board as claimed in claim 5, wherein the first connector connects a PATA (Parallel AT Attachment) hard disk drive.

7. The main board as claimed in claim 5, wherein the second connector connects a SATA (Serial AT Attachment) hard disk drive.

8. The main board as claimed in claim 1, wherein the plurality of first pins is welded on the first port.

9. The main board as claimed in claim 1, wherein the plurality of second pins is welded on the second port.

10. An electronic device, comprising:
a first hard disk drive;
a second hard disk drive; and
a main board, comprising:
a base comprising a first port and a second port, wherein the first port and the second port are parallel to each other, and a gap is formed therebetween;
a first connector comprising a first surface and a plurality of first pins disposed on the first connector; and
a second connector comprising a second surface and a plurality of second pins disposed on the second connector, wherein the first and second connectors are selectively disposed on the base,
wherein the first and second hard disk drives are selectively connected to the main board;
when the first connector is disposed on the base, the plurality of first pins is connected to the first port, a first distance is formed between the plurality of first pins and a standard surface, and the first hard disk drive is connected to the first connector;
when the second connector is disposed on the base, the plurality of second pins is connected to the second port, a second distance is formed between the plurality of second pins and the standard surface, and the second hard disk drive is connected to the second port; and
the difference between the first distance and the second distance is substantially equal to the gap.

11. The electronic device as claimed in claim 10, wherein when the first connector is disposed on the base, the first surface is aligned with the standard surface.

12. The electronic device as claimed in claim 10, wherein when the second connector is disposed on the base, the second surface is aligned with the standard surface.

13. The electronic device as claimed in claim 10, wherein the first connector further comprises a first body and the second connector further comprises a second body, the plurality of first pins is disposed on the bottom of the first body, the plurality of second pins is disposed on the bottom of the second body, and the width (thickness) of the second body exceeds the width (thickness) of the first body.

14. The electronic device as claimed in claim 10, wherein the number of the second pins is less than the number of the first pins.

15. The electronic device as claimed in claim 14, wherein the first hard disk drive is a PATA (Parallel AT Attachment) hard disk drive.

16. The electronic device as claimed in claim 14, wherein second hard disk drive is a SATA (Serial AT Attachment) hard disk drive.

17. The electronic device as claimed in claim 10, wherein the plurality of first pins is welded on the first port.

18. The electronic device as claimed in claim 10, wherein the plurality of second pins is welded on the second port.

* * * * *